United States Patent [19]

Kaiser et al.

[11] 4,260,847

[45] Apr. 7, 1981

[54] PROCESS AND APPARATUS FOR THE CONTINUOUS REMOVAL OF RESIDUAL HYDROCARBONS FROM POLYOLEFINS

[75] Inventors: Karl Kaiser, Brühl; Robert Willms, Hürth-Knapsack; Bernhard Kuxdorf, Brühl, all of Fed. Rep. of Germany

[73] Assignee: Hoechst Aktiengesellschaft, Fed. Rep. of Germany

[21] Appl. No.: 116,320

[22] Filed: Jan. 28, 1980

[30] Foreign Application Priority Data

Jan. 31, 1979 [DE]  Fed. Rep. of Germany ....... 2903586

[51] Int. Cl.$^3$ ............................................. B01D 3/22
[52] U.S. Cl. ..................................... 585/833; 203/61; 208/348; 208/356; 208/363; 585/834
[58] Field of Search ............... 208/347, 348, 350, 356, 208/363; 585/833, 834; 203/91, 92, 95, 96, 61

[56] References Cited

FOREIGN PATENT DOCUMENTS 1089547 9/1960 Fed. Rep. of Germany .
2521780 12/1976 Fed. Rep. of Germany .
2746909 6/1977 Fed. Rep. of Germany .

*Primary Examiner*—Frank Sever
*Attorney, Agent, or Firm*—Connolly and Hutz

[57] ABSTRACT

The invention relates to an improved process, wherein polyolefins are freed from saturated liquid residual hydrocarbons with the aid of water and steam. The improvement comprises A. introducing the hydrocarbon-containing polyolefin into an aqueous emulsifier-containing solution having a surface tension at 20° C. of about 50 to 60 dynes/cm with respect to air; stirring the resulting mixture and converting it to a homogeneous dispersion, the aqueous dispersion containing about 10 to 40 weight % of the polyolefin;

B. introducing the dispersion into the upper portion of a column provided with 5 to 30 sieve plates and overflow weirs and contacting the dispersion in countercurrent fashion with steam of about 100° to 120° C.

5 Claims, No Drawings

PROCESS AND APPARATUS FOR THE CONTINUOUS REMOVAL OF RESIDUAL HYDROCARBONS FROM POLYOLEFINS

This invention relates to a process for continuously freeing polyolefins from residual hydrocarbons, and to an apparatus for carrying out this process.

It is known that α-olefins and mixtures thereof can be polymerized by the Ziegler low pressure process with the aid of catalysts, which contain compounds of the elements belonging to subgroups IV to VI of the periodic system in combination with organometal compounds of the elements belonging to groups I to III of the periodic system, in saturated liquid $C_6$-$C_{11}$ hydrocarbons or suitable mixtures thereof, e.g. gasoline. During the work-up of the resulting polymers, the polyolefins which are suspended in the gasoline are separated from the dispersant by filtration with the use of a filter press. The polyolefins which are moist with gasoline can then be freed in various manner from adhering dispersant, e.g. by directly drying them in a contact drier or with the aid of hot air or an inert gas or by intensive steam distillation (cf. German Patent Specification "Auslegeschrift" No. 1,089,547).

Experience has shown that it is technically good practice to disperse gasoline-containing polymers in water and separate the gasoline from the aqueous phase by distillation with agitation, in the form of an azeotropic mixture with water. This method is not fully satisfactory, however, as considerable energy is required to be used for the distillative removal of residual gasoline. In addition to this, the distillative treatment gives rise to the formation of widely different azeotropic gasoline/water-mixtures, which call for the use of specifically designed distilling columns of appropriate separating efficiency.

A further process for removing monomers from an aqueous dispersion of a polymer containing at least 50 weight% of polymerized vinyl chloride has been described in German Patent Specification "Offenlegungsschrift" No. 2,521,780, wherein the dispersion is introduced into the upper portion of a sieve plate column and contacted countercurrently therein over a period of about 10 seconds to 20 minutes with steam of about 100° to 150° C. under a pressure of about 600 to 1200 mm Hg. Next, the polymer dispersion is removed through the base portion of the column, while a vapor mixture which escapes overhead is subjected to stagewise condensation so as to recover an aqueous phase and the monomers.

The process just described is not suitable for use in the removal of residual hydrocarbons from polyolefins, for the following reasons:

As compared with polyolefins, polyvinyl chloride has a density of more than 1.4, i.e. a density higher than that of water. In other words, an aqueous polyvinyl chloride dispersion which is introduced into the upper portion of a column will naturally travel downwardly, countercurrently to steam which ascends therein. This flow behaviour of polyvinyl chloride is in contrast with that of polyolefins which are specifically less dense than water. They float on the water surface rather than to travel downwardly in a column. It is also noted that the process described in German Patent Specification "Offenlegungsschrift" No. 2,521,780 is used for the removal of vinyl chloride which is gaseous under standard conditions, whereas the residual hydrocarbons which are to be removed from polyolefins have a boiling range of 60° to 190° C. and are accordingly in the liquid state. It should also be borne in mind that an aqueous polyvinyl chloride dispersion contains vinyl chloride in proportions of some ppm (ppm stands for parts per million) which do substantially not affect the nature of the dispersion. In contrast with this, the polyolefin dispersions which are to be treated in accordance with this invention contain considerably more significant proportions of undesirable materials which may (a) seriously affect the interfacial activity of the dispersion and are (b) liable to form azeotropes with the dispersant. Needless to say therefore the removal of gasoline raises a problem in respect of diffusion and entails additional difficulties which arise during the distillation, e.g. the deposition of solid matter or formation of foam.

A still further process, wherein polyolefins which are made by subjecting α-olefins to catalytic polymerization in contact with standard catalyst mixtures of heavy metal compounds and organometal compounds, and contain about 10 to 50 weight% of saturated liquid residual hydrocarbons with at least 5 carbon atoms in the molecul, are freed from those residual hydrocarbons by means of steam and water has been described in German Patent Application "Offenlegungsschrift" No. 2,746,909, which process comprises:

(a) introducing the hydrocarbon-containing polyolefin into an aqueous emulsifier-containing solution having a surface tension at 20° C., with respect to air, of about 50 to 68 dynes/cm; stirring the resulting mixture and converting it to a homogeneous dispersion; the aqueous dispersion containing about 10 to 40 weight% of the polyolefin;

(b) introducing the dispersion into the upper portion of a column with at least 5 sieve plates therein; contacting it countercurrently with steam of about 100° to 120° C., the individual plates provided in the column having a free cross-sectional area which increases continuously from the lowermost to uppermost plate by about 3% up to 90% of the plate surface area, and being spaced apart from each other at approximately the same ratio from below to above; and (c) removing, through the base portion of the column, an aqueous polyolefin dispersion free from hydrocarbons and separating the polyolefin from the water, and distilling off overhead a hydrocarbon/water-azeotrope or azeotropic mixture, condensing the azeotrope or azeotropic mixture in a condenser and separating it into its components in a separator downstream of the condenser.

The principal problem which is associated with the removal of residual hydrocarbons from a polyolefin dispersion in a sieve plate-provided column is the density of the solid matter which is low compared with that of the liquid phase. In other words, on subjecting the dispersion to treatment with steam or an inert gas, less dense solid matter, which floats on the liquid phase, is liable to go forward into the gas chamber and, after some prolonged operation, to clog the underside of the sieve plates. This is an adverse effect which cannot be avoided by the process described in German Patent Specification "Offenlegungsschrift" No. 2,746,909.

As has been found, the sieve plates in a standard column are not liable to become clogged by solid material provided that individual structural parts of the column are modified and provided also that the individual sieve plates are operated under process conditions permitting liquid phase to be periodically dropped through—so as to clean—the perforations forming part of the sieve plates.

The present invention relates more particularly to a process wherein polyolefins which are obtained by subjecting olefins to polymerization in contact with standard catalyst mixtures comprised of heavy metal compounds and organometal compounds, and contain 10 to 50 weight% of residual saturated hydrocarbons with at least 5 carbon atoms in their molecule or mixtures of such residual hydrocarbons are freed from those residual hydrocarbons by means of water and steam, which process comprises:

A. introducing the hydrocarbon-containinig polyolefin into an aqueous emulsifier-containing solution having a surface tension at 20° C., with respect to air, of about 50 to 60 dynes/cm; stirring the resulting mixture and converting it to a homogeneous dispersion, the aqueous dispersion containing about 10 to 40 weight% of the polyolefin;

B. introducing the dispersion into the upper portion of a column provided with 5 to 30 sieve plates and overflow weirs and contacting the dispersion in countercurrent fashion with steam of about 100° to 120° C., the dispersion being introduced into the upper portion of the column in a quantity which is necessary:

(a) to provide a ratio of dispersion volume (in $m^3$) to free cross-sectional sieve plate area (in $m^2$) of 1 to 8, preferably 1.5 to 2.5;

(b) to provide a ratio of dispersion quantity ($m^3$) admitted per unit time (h) to free cross-sectional sieve plate area ($m^2$) of 150 to 600;

(c) to operate the column under the specific load, defined by the quantity of dispersion ($m^3$) admitted per unit time (h) per $m^2$ of column cross-sectional area of 5 to 35, preferably 15 to 30;

(d) to operate the column under a specific steam load, defined by the quantity of steam admitted per unit time (h) per $m^2$ column cross-sectional area, of 1000 to 4000, preferably 1500 to 2500 [$kg/m^2 \cdot h$];

(e) to establish a mean sojourn time of the dispersion on each of the individual sieve plates of 0.1 to 2.5, preferably 0.3 to 0.6 minutes, and C. removing, from the base portion of the column, an aqueous polyolefin dispersion free from hydrocarbons and separating the polyolefin from the water; and distilling off overhead a hydrocarbon/water-azeotrope of azeotropic mixture, condensing the azeotrope or azeotropic mixture in a condenser and separating it into its components in a separator downstream of the condenser.

The residual hydrocarbons which are to be removed in accordance with this invention from polyolefins, e.g. polyethylene or polypropylene, generally contain 6 to 11 carbon atoms and are contained in the polyolefin in a proportion of 20 to 50 weight%. The residual hydrocarbons concerned comprise more specifically hexane and the residual hydrocarbon mixtures comprise gasoline with a boiling range of about 60° to 190° C.

It is more particularly advantageous to supply the upper portion of the sieve plate column with an optionally preheated aqueous polyolefin dispersion. It is also good practice to use an aqueous emulsifier-containing solution which has a surface tension at 20° C. of 61 to 68 dynes/cm with respect to air, in order to prevent the dispersion from foaming inside the column. One of the useful emulsifiers is e.g. stearic acid ethoxylated with 30 mols of ethylene oxide. In order to ensure reliable distillation, care should be taken to establish, near the column head, a temperature which is higher than the boiling point of the hydrocarbon/water-azeotrope to be separated.

The present invention also relates to an apparatus for carrying out the present process. A similar apparatus has been described in U.S. Pat. No. 4,062,662. This is a sieve plate column for the continuous removal of residual hydrocarbons from polyolefins comprising: a vertically elongated tubular shell provided with a plurality of substantially horizontally disposed perforated plates, said plates being vertically spaced within and attached to the inner surface of the shell; a reasonably small gap uniform in width over the periphery being left between each of said plates and said shell; each of said plates being penetrated by at least one eccentrically arranged conduit comprising a draining shaft in the upper portion thereof and a feed shaft in the lower portion below the penetrated plate, and a surface portion of each perforated plate underneath each conduit being impermeable, said impermeable surface portion being one of two times the cross-sectional area of the conduit.

The features in which the column of the present invention differs from that disclosed in U.S. Pat. No. 4,062,662 provide:

(a) for the ratio of plate spacing to height of draining shaft to be 4 to 5;

(b) for the ratio of height of draining shaft to column diameter to be 1.1 to 0.1;

(c) for the ratio of height of draining shaft to diameter of perforations in perforated plates to be 70 to 220;

(d) for the ratio of height of draining shaft to distance between lower end of feed shaft and next plate below it to be 2.5 to 9;

(e) for the column to comprise 15 to 30 plates; and (f) for the free cross-sectional area to be 3 to 10% the cross-sectional area of the column.

It was not easy to provide a solution for the problem underlying the present invention, for the following reasons:

To comply with the operating conditions in a distilling column, it is necessary for the dispersion to have certain properties which, however, may be seriously affected by (a) the need to use an emulsifier for dispersing the polyolefin in water and (b) the gasoline concentration which gradually varies from plate to plate during the distillation. In those cases in which a water/gasoline/polyolefin-dispersion is distillatively separated in a standard sieve plate column, in which the individual sieve plates have equal free cross-sectional areas and are arranged at equal separations, a dispersion foam is liable to form and accumulate in the upper portion of the column, under the distillation conditions. In other words, the foam which does not travel downwardly to the column base portion is ultimately removed overhead. A further complication resides in the fact that the polyolefin dispersion portions retained on the various plates have specific densities which are irregularly affected by the gasoline concentration, emulsifier quantity, and flow velocity of the dispersion through the perforations in the respective sieve plate. These are factors which vary from plate to plate so that it is extremely difficult by the use of conventional means simultaneously to operate all plates under stable equilibrium conditions which would permit the gasoline to be quantitatively distilled off overhead in the form of an azeotrope with water, and gasoline-free polyolefin to be removed through the column base portion.

The present process and apparatus now provide conditions which even permit the underside of sieve plates to be kept free from depositing polymer. In addition to this, dispersion foam is not liable to be produced on the individual plates of the present column wherein the plates are spaced apart at separations larger than those employed in customary sieve plate columns. In contrast with the sieve plates in a customary column, those which are used in accordance with this invention are given a free cross-sectional area which permits the dispersion to be periodically dropped through the perforations in the sieve plate, under the gas load prevailing. The width selected for the perforations permits the quantity of dispersion which is periodically dropped through the sieve plates to be kept within certain limits and serious adverse effects on the residence time of the dispersion on the respective sieve plate to be avoided. In other words, the perforations have the width just necessary for dropping suspension therethrough so as to produce a soaking effect.

In a column with customary weir heights and the perforation diameter suggested in accordance with this invention, the desirable soaking effect would not be produced. To produce the soaking effect, it is necessary to make the weirs considerably higher than heretofore. Only then is it possible for the gas/liquid/solid matter-mixture to move more and more on the sieve plate and produce a locally alternating periodic soaking affect. This is possible with the use of weir heights of 100 to 500 mm, for example.

The present process enables energy savings to be effected and compares favorably in this respect with the prior art methods, wherein polyolefins are freed from residual hydrocarbons by steam distillation. In addition to this, it can be carried out continuously in a column in which the sieve plates are substantially not liable to become clogged by polymer depositing on the sieve plates' underside.

EXAMPLE 1

An aqueous polypropylene suspension, which contained about 26 weight% of solid matter and about 4 weight% of residual gasoline, based on solid matter, was continuously taken over a period of 12 days from a polypropylene production plant. The residual gasoline had a boiling range of 140° to 190° C.

To remove the residual gasoline from the suspension, the latter was admixed with about 100 ppm of an emulsifier which was stearic acid ethoxylated with 30 mols of ethylene oxide. The suspension with the emulsifier therein had a surface tension at 20° C. of 60 dynes/cm, with respect to air. Next, the suspension was introduced at a rate of 3.5 m$^3$/h into the upper portion of a sieve plate-provided column and treated countercurrently therein with steam of 105° C. The temperature maintained in the column head portion was 102° C. and the pressure maintained at the lowermost sieve plate in the column was 1.28 bars. The ratio of dispersion volume on the individual sieve plates to the free cross-sectional area of the sieve plates was 2(m$^3$/m$^2$) and the ratio of dispersion quantity introduced per unit time to free cross-sectional area of the sieve plate was 464(m$^3$/m$^2$·h).

The column was operated under a specific suspension load of 28(m$^3$/m$^2$·h) and under a specific steam load of 1800 (kg/m$^2$·h). The mean residence time of suspension on the respective sieve plate was 0.3 minute. Suspension which was obtained in the column base portion contained 0.9 weight% of residual gasoline and a gasoline/-steam-mixture was removed overhead.

Characteristic of the sieve plate column were the following data:

| | | | |
|---|---|---|---|
| (a) | Height of column: | 4.2 | m |
| (b) | Diameter of column: | 0.4 | m |
| (c) | Number of sieve plates provided with overflow weirs: | 7 | |
| (d) | Height of overflow weirs: | 140 | mm |
| (e) | Distance of feed shaft to plate directly below it | 30 | mm |
| (f) | Sieve plate spacing: | 0.6 | m |
| (g) | Free gas space above uppermost plate: | 0.075 | m$^3$ |
| (h) | Free cross-sectional area of individual sieve plates: | 6 | % |
| (i) | Ratio of plate spacing to height of draining shaft: | 4.29 | |
| (k) | Ratio of height of draining shaft to diameter of column: | 0.35 | |
| (l) | Ratio of height of draining shaft to perforation diameter: | 70 | |
| (m) | Ratio of height of draining shaft to distance between lower end of feed shaft and plate directly below it: | 4.67 | |
| (n) | Gap left between column shell and sieve plate: | 2 ± 1 | mm |

EXAMPLE 2

The procedure was as in Example 1 but the test was run over a period of 4 days with the use of a suspension which contained 7 to 8 weight% of residual gasoline, based on solid matter. Suspension which contained 0.8 weight% of gasoline was obtained in column base portion.

EXAMPLE 3

The procedure was as in Example 1 save that the test was run over a period of 6 days, that the lowermost plate was operated under a pressure of 1.6 bars, that steam of 108° C. was used, and that the column head was maintained at a temperature of 107° C. The suspension contained 7 to 8 weight% of residual gasoline, based on solid matter. Suspension obtained in the column base portion contained 1.3 weight% of residual gasoline.

EXAMPLE 4

The procedure was as in Example 1 save that the test was run over a period of 6 days, that the lowermost plate was operated under a pressure of 1.9 bars, that steam of 114° C. was used, and that a temperature of 113° C. was maintained in the column head portion. The suspension contained 3 weight% of residual gasoline, based on solid matter. Suspension which was obtained in the column base portion contained 0.7 weight% of gasoline.

We claim:

1. In a process wherein polyolefins which are obtained by subjecting olefins to polymerization in contact with standard catalyst mixtures comprised of heavy metal compounds and organometal compounds, and contain 10 to 50 weight% of residual saturated hydrocarbons with at least 5 carbon atoms in their molecule or mixtures of such residual hydrocarbons are freed from those residual hydrocarbons by means of water and steam, the improvement which comprises:

A. introducing the hydrocarbon-containing polyolefin into an aqueous emulsifier-containing solution having a surface tension at 20° C., with respect to air, of about 50 to 60 dynes/cm; stirring the resulting mixture and converting it to a homogeneous dispersion, the aqueous dispersion containing about 10 to 40 weight% of the polyolefin;

B. Providing a sieve plate column wherein a vertically elongated tubular shell is provided with a plurality of substantially horizontally disposed perforated plates, said plates being vertically spaced within and attached to the inner surface of the shell; a reasonably small gap uniform in width over the periphery being left between each of said plates and said shell; each of said plates being penetrated by at least one eccentrically arranged conduit comprising a draining shaft in the upper portion thereof and a feed shaft in the lower portion below the penetrated plate, and a surface portion of each perforated plate underneath each conduit being impermeable, said impermeable surface portion being one to two times the cross-sectional area of the conduit, and in which sieve plate column:

(a) the ratio of plate spacing to height of draining shaft is 4 to 5;

(b) the ratio of height of draining shaft to column diameter is 1.1 to 0.1;

(c) the ratio of height of draining shaft to diameter of perforations in perforated plates is 70 to 220;

(d) the ratio of height of draining shaft to distance between lower end of feed shaft and next plate below it is 2.5 to 9;

(e) the column comprises 5 to 30 plates; and (f) the free cross-sectional area is 3 to 10% the cross-sectional area of the column; and introducing the said aqueous dispersion into the upper portion of the said sieve plate column; and C. removing, from the base portion of the column, an aqueous polyolefin dispersion free from hydrocarbons and separating the polyolefin from the water; and distilling off overhead a hydrocarbon/water-azeotrope or azeotropic mixture, condensing the azeotrope or azeotropic mixture in a condenser and separating it into its components in a separator downstream of the condenser.

2. The process as claimed in claim 1, wherein the residual hydrocarbons are hexane or gasoline.

3. The process as claimed in claim 1, wherein the residual hydrocarbons are separated from polyethylene or polypropylene.

4. The process as claimed in claim 1, wherein the emulsifier is ethoxylated stearic acid.

5. The process as claimed in claim 1, wherein a temperature higher than the boiling point of the hydrocarbon/water-azeotrope which is to be separated is maintained in the column head portion.

* * * * *